United States Patent [19]
Matthews et al.

[11] 4,103,419
[45] Aug. 1, 1978

[54] PIPE CUTTER

[75] Inventors: Bruce Ernest Matthews, Warrandyte; Ronald Day, Mt. Evelyn, both of Australia

[73] Assignee: The Stanley Works Pty. Ltd., Nunawading, Australia

[21] Appl. No.: 784,337

[22] Filed: Apr. 4, 1977

[30] Foreign Application Priority Data

Aug. 19, 1976 [AU] Australia .............................. PC7070

[51] Int. Cl.² ............................................ B23D 21/06
[52] U.S. Cl. ...................................................... 30/95
[58] Field of Search .................................. 30/93–102, 30/91.2

[56] References Cited

U.S. PATENT DOCUMENTS

| | | | |
|---|---|---|---|
| 837,805 | 12/1906 | Delehant | 30/94 |
| 2,230,030 | 1/1941 | Finch | 30/102 |
| 2,502,701 | 4/1950 | Capewell | 30/102 |
| 2,734,267 | 2/1956 | Palmer | 30/102 |
| 3,025,597 | 3/1962 | Huglin | 30/91.2 |
| 3,240,088 | 3/1966 | Samuels et al. | 30/102 |

*Primary Examiner*—Robert C. Watson

[57] ABSTRACT

A pipe cutting device for plastics pipe, including two members pivoted together and carrying jaws which can be opened and closed by respective closing and opening movements of generally colinear handles of the members. The jaws carry rollers so that the jaws, when closed, bring the rollers into engagement with the periphery of the pipe to be cut in such a way that the device can be easily moved circumferentially around the pipe, one member carrying a cutting element which circumferentially cuts the pipe during such movement.

9 Claims, 7 Drawing Figures

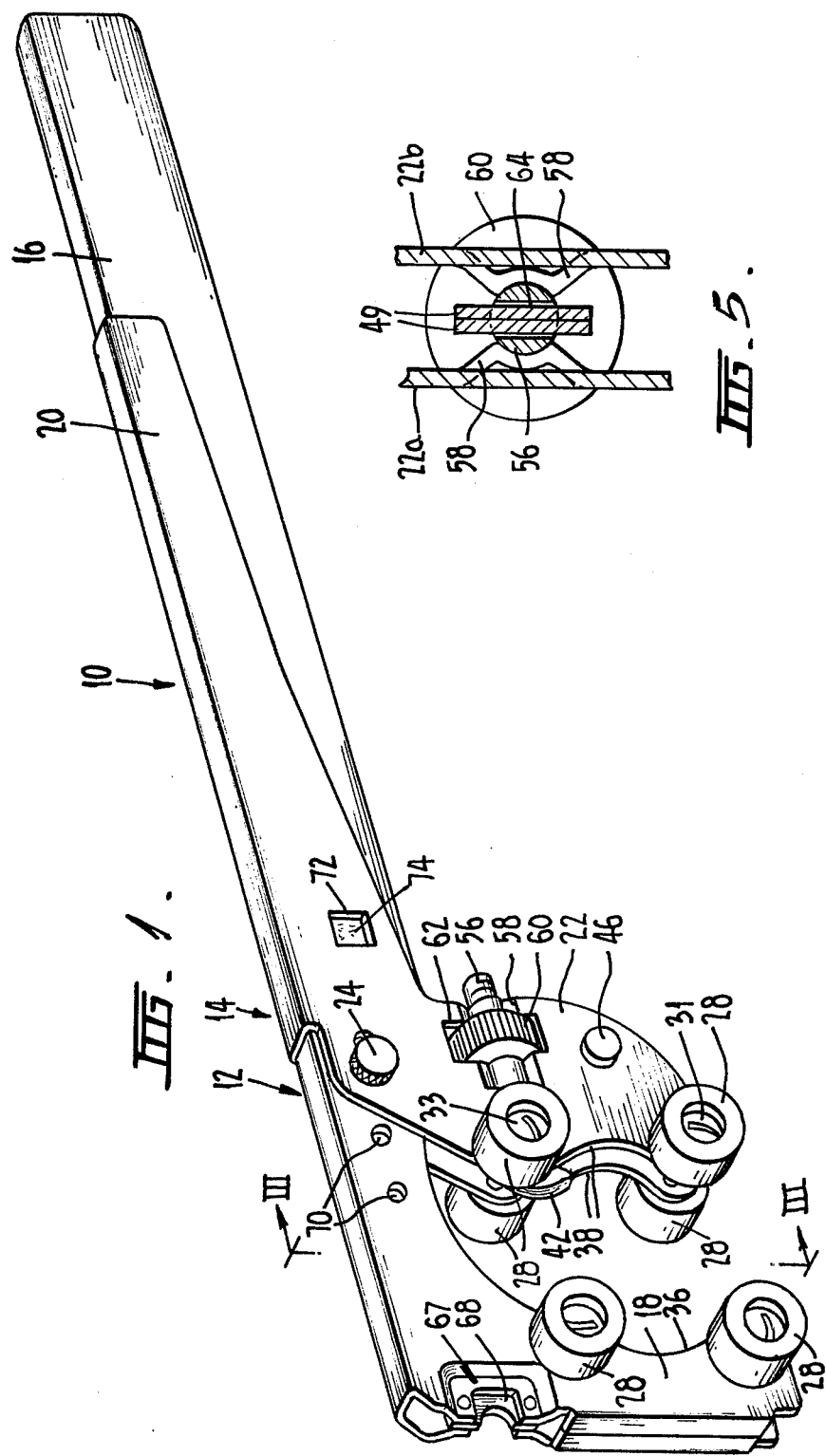

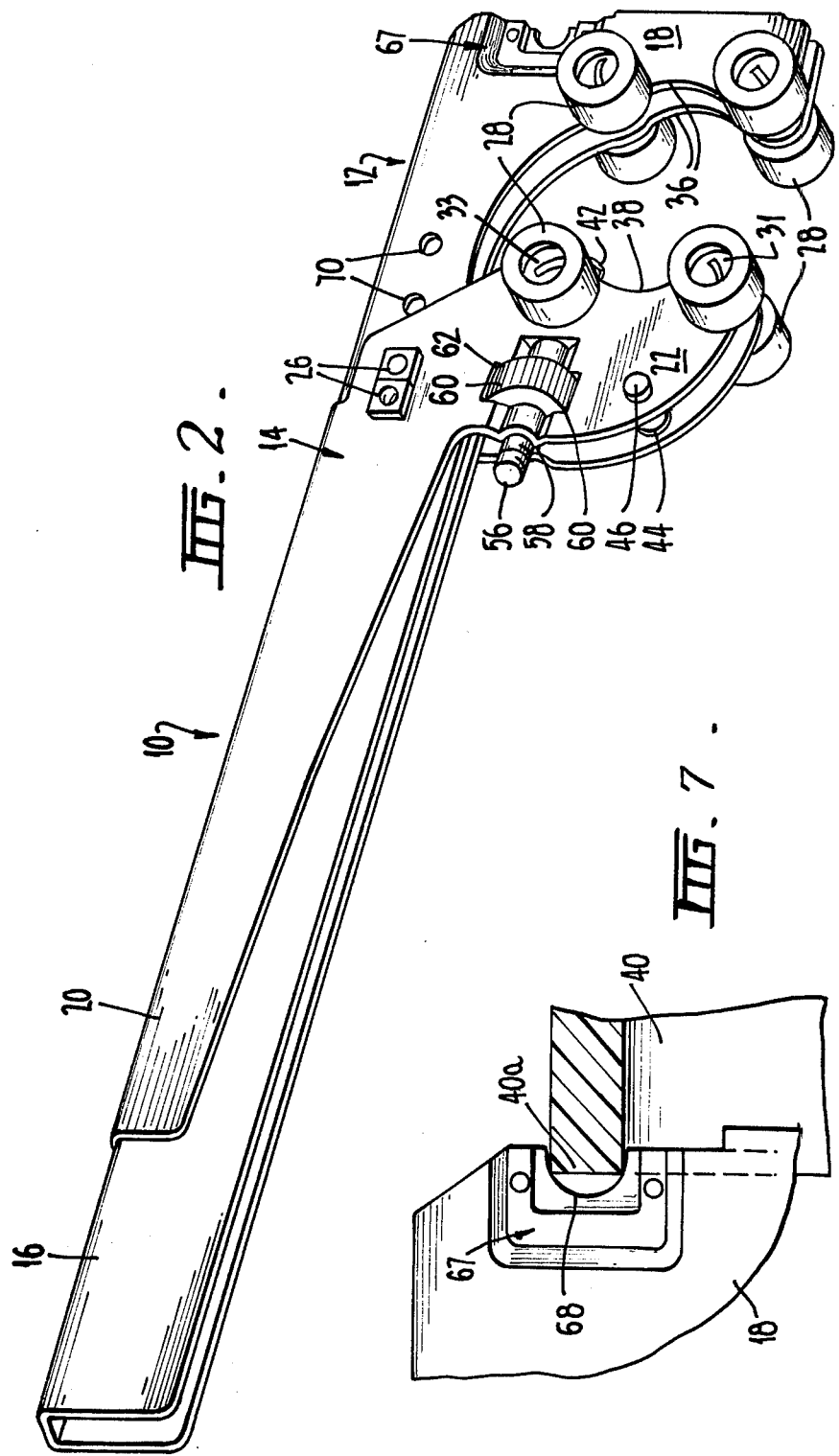

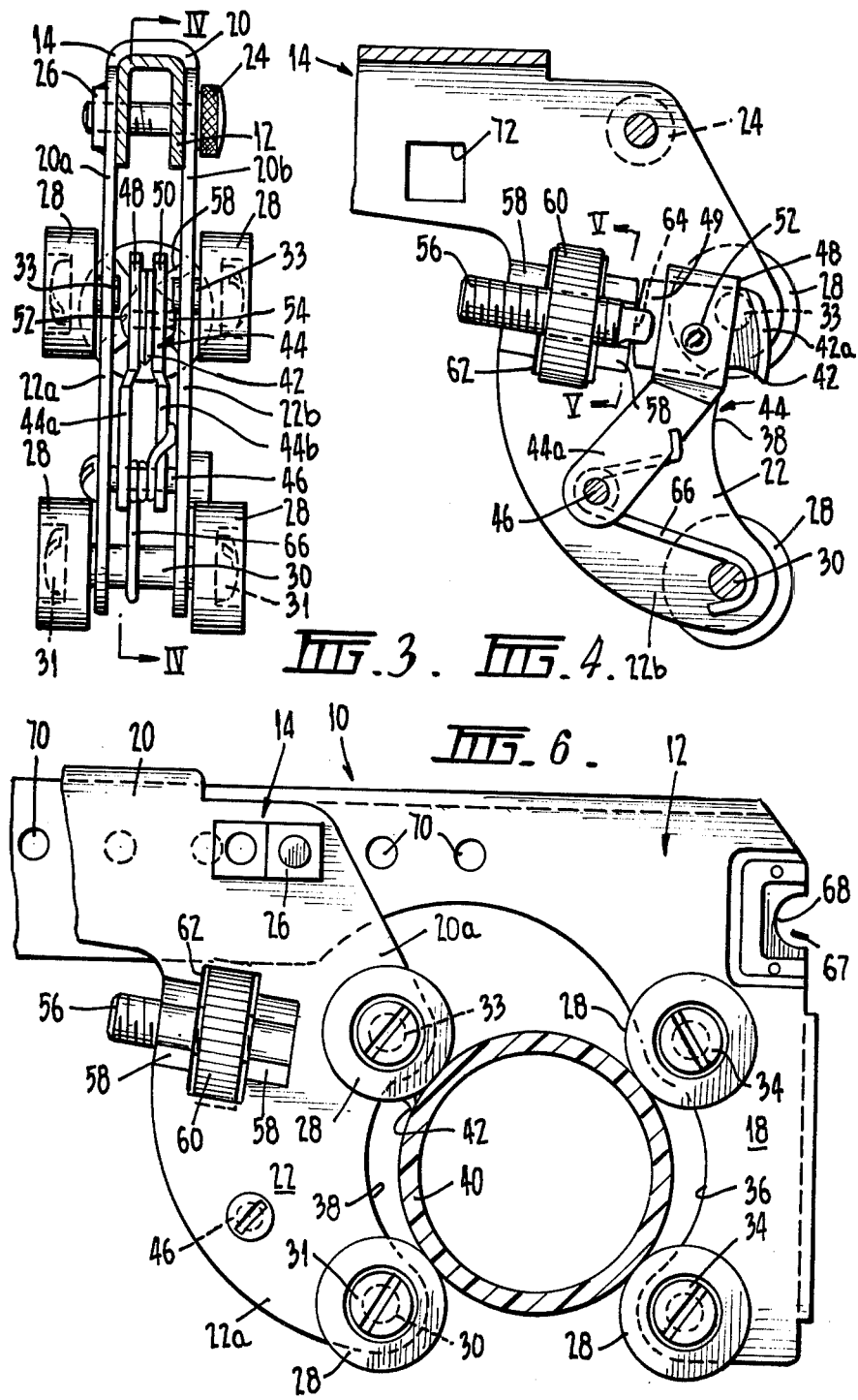

PIPE CUTTER

BACKGROUND OF THE INVENTION (i) Field of the Invention

This invention relates to a pipe cutting device, particularly, but not exclusively for cutting plastics pipes.

(ii) Prior Art

Well-known pipe cutting devices are, generally, of heavy construction and are provided with means for maintaining substantial radially inwardly directed forces against a cutting wheel which is pressed into and then moved about the periphery of the pipe to effect cutting. Typically, such devices may include a pair of jaws slidable or pivoted for movement towards and away from each other and one of which carries the cutting wheel. The jaws are, for example, movable towards and away from each other by rotating a screw threaded shank passing through a threaded aperture in one jaw and pressing against the other jaw, the shank usually extending outwardly to provide a lever of some length. With such an arrangement, the necessary force for engaging the cutting wheel with the pipe periphery can easily be generated by screwing the threaded shank to press the movable jaw firmly against the pipe, whilst the long lever arm provided by the shank provides for force multiplication to enable a user to generate a force sufficient to turn the pipe cutter around the periphery of the pipe, this force being not insignificant because the friction forces between the cutting wheel and pipe are high in consequence of the high radial force applied to the wheel.

Devices for cutting plastic pipes have tended to follow the pattern of devices previously developed for cutting metal pipes, with only relatively small modifications. Particularly, devices for cutting plastics pipes normally include some mechanical means such as the aforementioned screw threaded shank which can be operated to apply a constant and substantial force to press a cutting wheel against the periphery of the pipe. Now, the operation of positioning a cutting device of this type on a pipe, for use of the device, is somewhat inconvenient since the user must hold the device in one hand and screw the threaded shank with the other so that the jaws exert pressure against the pipe. Thus, the pipe must normally be mechanically held during fitting of the device to the pipe, because the user has no free hand to use for this purpose. It is one object of the invention to provide a pipe cutting device for plastic pipes which is more convenient in use.

BRIEF DESCRIPTION OF THE INVENTION

The invention is based on the realization that the radial force necessary to engage cutting elements with the periphery of a plastics pipe for the purpose of ensuring adequate cutting action is considerably less than is necessary for metal pipes and that the force can, in principle, be provided and maintained manually.

More particularly, in accordance with one aspect of the invention there is provided a pipe cutting device having a pair of elongate members which are interconnected, at locations intermediate their ends, by a pivot element such that the members cross at the pivot element, parts of the members to one side of the pivot element defining a pair of elongate handles and parts thereof to the other side defining a pair of opposed jaws so that pivotal movement of the handles away from each other causes opening of said jaws such as to permit entry therebetween of a pipe to be cut and pivot movement of the handles towards each other causes closing of the jaws for gripping the pipe, said handles extending in generally the same directional sense away from the pivot element in generally aligned relationship, when a pipe is so gripped, to permit single handed grasping of the two handles to enable manual force to be applied to the handles to firmly maintain gripping of the pipe; one said member carrying a cutting element mounted so that it can be brought into engagement with the periphery of the gripped pipe whereby, by effecting circumferential movement of the device around the gripped pipe, the pipe periphery will be cut by the cutting element.

The invention may be better understood from the following description of one form of pipe cutting device constructed in accordance with the invention, this description to be read in conjunction with the accompanying drawing.

BRIEF DESCRIPTION OF THE SEVERAL VIEWS OF THE ACCOMPANYING DRAWING

FIG. 1 is a perspective view of the cutting device from one side;

FIG. 2 is a perspective view of the cutting device from the other side;

FIG. 3 is a view of the device taken on line III—III of FIG. 1;

FIG. 4 is a cross-section of one member of the device of FIG. 1 taken approximately on the line IV—IV in FIG. 3;

FIG. 5 is a fragmentary cross-section on the line V—V in FIG. 4;

FIG. 6 is a fragmentary side view of the device of FIG. 1 and showing a pipe positioned therein for cutting; and FIG. 7 is a fragmentary cross-sectional view of a pipe after cutting with the device of FIG. 1 with part of the device also being shown, this part including a scraping element shown in position for removing burred edges from the cut edge of the pipe.

DETAILED DESCRIPTION

The cutting device 10 shown includes two operating members 12, 14 which are mounted for pivotal movement one relative to the other. Member 12 is formed from bent steel plate and includes an elongate handle 16 and jaw portion 18, the jaw portion extending generally normally to the direction of extent of the handle and being at one end of the handle. Member 14 is also formed from bent steel plate and includes a handle 20 and a jaw portion 22, the jaw portion 22 being at one free end of the handle and extending generally normally to the direction of extent of the handle. The handles 16 and 20 are each of generally U-shaped cross-section and handle 16 is fitted within handle 20 so as to be slidable lengthwise thereof. The two handles are pivoted together by means of a thumb screw 24 which passes through an aperture in one side of the handle 20, through apertures in the sides of handle 16 and thence into one of two threaded bosses 26, 27 in the other side of handle 20. When so pivoted together, handle 16 extends forwardly of jaw portion 22 so that the jaw portion 18 is positioned outboard of jaw portion 22 and in generally parallel opposed relationship thereto.

Jaw portion 22 carries four wheels 28. These are arranged in two pairs, one pair of wheels being at opposite ends of an axle 30 which passes through spaced parallel side flanges 22a, 22b of jaw portion 22, the wheels being held in position by heads of screws 31 which are engaged in threaded end bores of the axle 30 (FIG. 3). These wheels 28 are thus to opposite sides of the jaw portion 22 and, as can be seen for example from FIG. 1, are situated towards the free end of the jaw portion remote from handle 20. The wheels 28 of the other pair on jaw portion 22 are carried by stub axles 33 projecting outwardly from the flange portions 20a, 20b, so as, once more, to be positioned to opposite sides of the jaw portion. In a similar manner, four wheels 28 are also carried by jaw portion 18. One pair of the wheels on jaw portion 18 is disposed towards the free end of the jaw portion 18 and the other on the jaw portion 18 close to the handle 16. The wheels 28 on jaw portion 18 are each carried by separate axles formed by screws 34 threaded into and projecting to each side of the member 12.

The four pairs of wheels 28 define therebetween an imaginary circle corresponding to the circumference of a pipe to be received therebetween.

The jaw portions 18, 22 present opposed concave edges 36, 38 respectively and are arranged such that a plastics pipe 40 can be accommodated between these edges with the wheels 28 engaging the periphery thereof whilst clearing jaw portions 18, 22 as shown in FIG. 6.

Jaw portion 22 carries planar cutting element 42 of blade like form, having a cutting edge formed, at a pointed projecting end of the element, by an edge 42a extending across the thickness of the element. This is secured to a carrier 44 which is in the form of a lever pivotally mounted at one end between the two flanges 22a, 22b of jaw portion 22 and on a shaft 46 extending between these. Carrier 44 is composed of two overlying plates 44a, 44b which are bent so as to define well separated end portions at the locations where shaft 46 passes therethrough, whilst the opposite ends are arranged to define portions 48, 50 which are spaced but relatively closely overlie each other. The cutting element 42 is located between these portions 48, 50 and clamped in position by a machine screw 52 and cooperating nut 54, the bolt extending through openings in the cutting element and portions 48, 50.

The cutting element 42 is positionable, by appropriate pivotal movement of the carrier 44 to project outwardly from the jaw portion 22. Thus, rearmost margins 49 of carrier plate portions 48, 50 are depressed to lie flat against each other so as to present rear edges against which the rear edge of cutting element 42 lies to assist in locating the cutting element.

A threaded element 56 is located for axial movement about a fixed axis by means of two inwardly depressed sections 58, one on each of the flanges 22a, 22b. A nurled nut 60 is threadedly engaged on this and positioned so that opposed portions thereof project from outer surfaces of the flanges 22a, 22b through slots 62 in the flanges. The slots 62 are dimensioned so as to limit movement of nut 60 axially along element 56 but not to prevent rotation of the nut. An innermost end of element 56 has a transverse slot 64 and margins 49 of carrier plates 44a, 44b are located within this. The arrangement is thus such that when nut 60 is turned, element 56 is moved along its axis to establish a selectable position of maximum permitted retraction of carrier 44 back into jaw portion 22 between flanges 20a, 20b, the rear edges of margins 49 bearing against the base of the slot 64. An elongate spring 66 has one end engaged about axle 30, an intermediate portion wound around shaft 46 and the other end portion positioned to bear against a forward edge of carrier 44. This spring biasses the carrier 44 so that the rear edges of the margins 49 are maintained against the base of groove 64 in element 56 so that the position of the carrier is maintained set at the location determined by the prevailing position of the element 56, which position is, as indicated, varied by manual turning of nut 60.

To use the cutting device 10 to cut pipe 40 the jaw portions 18, 22 are opened by pivoting the members 12, 14 one relative to the other to an extent sufficient to enable the pipe 40 to be cut to be positioned between the jaw portions and the members 12, 14 are then pivoted back again to bring the wheels 28 into engagement with the periphery of the pipe. By grasping the two handles 16, 20 and pressing them together about the pivot axis therebetween, pipe 40 is gripped firmly by pressure applied through wheels 28. The nut 60 is turned to bring the forward tip of cutting element 42 into engagement with the periphery of the pipe and then, whilst maintaining pressure by gripping handles 16, 20, the cutting tool is advanced around the circumference of the pipe so that the cutting tool makes a circular score mark therein. By continued rotation of the cutting device about the pipe, and by successive advancement of the cutting element to project further into the score mark, complete cutting off of the pipe may be readily effected. The thus produced cut end of the pipe is very accurately square to the axis of the pipe, this being an important consideration where subsequent jointing of the pipes by glueing is to be achieved. The cutting action may result in some degree of outwardly and/or inwardly extending peripheral beading at the cut, although the extend of this beading is considerably less than is experienced when cutting plastic pipes with, for example, cutting elements in the form of cutting wheels of the kind customarily employed with metal pipes. The beading can, in any event, by readily removed by scraping with a scraping element 66 which is affixed into a recess in the outer edge of jaw portion 18. This element is planar and has a concave cutting edge 68. As shown in FIG. 7, the device 10 is positioned for removing such beading by engaging the cut edge 40a of the pipe 40 against the concave cutting edge 68. The cutting edge 68 can then be removed around the edge 40a to remove beadings to either side.

In order to enable a variety of pipe sizes to be cut the thumb screw 24 is removable, by extracting it completely from nut 26, and a series of pivot holes 70 is provided in the side flanges of member 12, these being spaced along the length thereof to permit the thumb screw to pass therethrough to pivot the two members 12, 14 together at a variety of spacings between the two jaw portions 18, 22. An aperture 72 may be provided in one of the side flanges of members 14 through which numerals 74 indicating the size of pipe which can be accommodated within the jaws, for a corresponding position of thumb screw 24, can be viewed. There are thus a series of numerals printed along the side of handle 16, appropriate ones of these being viewed at corresponding settings of the thumb screw.

Of course, instead of providing the thumb screw 24 the members 12, 14 could be pivoted together in a manner known per se to permit adjustment of the pivot point over a continuous range by manipulation of a screw or like device at the end of one member 12, 14.

The described arrangement has been advanced merely by way of explanation and many modifications may be made thereto without departing from the spirit and scope of the invention as defined in the appended claims.

We claim:
1. A pipe cutting device comprising:
   A. a first operating member having an elongated handle portion and a jaw portion at one end thereof having its longitudinal axis extending transversely of the longitudinal axis of said handle portion;
   B. a second operating member having an elongated handle portion and a jaw portion at one end thereof having its longitudinal axis extending transversely of the longitudinal axis of said handle portion, the longitudinal axes of the handle portions of said first and second operating members being closely spaced and substantially parallel, the jaw portion of said second operating member being disposed in spaced relationship to said first operating member to provide a spacing between said jaw portions for receiving a pipe therebetween;
   C. pivot means pivotably mounting said operating members adjacent the jaw portion of said first operating member for movement of the jaw portions about a pivot point defined thereby in response to movement of said handle portions, said handle portions extending in close parallel relationship in the closed position thereof and the jaw portions also extending in generally parallel relationship in the closed position thereof, movement of said first operating member handle portion away from said second operating member handle portion causing pivoting of said jaw portions to increase the spacing therebetween at the outer ends thereof to permit insertion of a pipe therebetween;
   D. a pair of guide roller means rotatably mounted on each of said jaw portions and spaced along the length thereof with the periphery of said guide roller means extending beyond the opposed edges of said jaw portions and defining an imaginary circle therebetween for gripping and rotatably supporting a pipe therebetween;
   E. a cutting blade mounted on the jaw portion of said one operating member for movement beyond the opposed edges of the jaw portion and into the imaginary circle defined by said guide roller means; and
   F. adjustment means for said cutting blade mounted on said jaw portion of said first operating member and operable to move said cutting blade relative to the opposed edge of the jaw portion, whereby the pipe may be gripped between said jaw portions and supported upon said roller means by one-handed gripping of said handle portions and the cutting blade may be advanced by manipulation of the adjustment means into progressively deeper engagement with the associated pipe to sever the pipe upon rotation of the cutting device about the pipe.

2. The cutting device of claim 1 wherein said pivot means permits shifting of the pivot point along the length of said second operating member to vary the spacing between said jaw portions in the closed position thereof.

3. The cutting device of claim 1 wherein said opposed edges of said jaw portions are concavely arcuate between the pair of spaced guide roller means thereof.

4. The cutting device of claim 1 wherein said guide roller means each comprise a pair of rollers on opposite sides of said jaw portions.

5. The cutting device of claim 4 wherein said cutting blade is disposed between the pair of rollers closest to the handle portion of said first operating member.

6. The cutting device of claim 1 wherein said handle portions of said operating members are of generally U-shaped cross section with the handle portion of said first operating member receiving the handle portion of said second operating member therewithin.

7. A pipe cutting device comprising:
   A. a first operating member having an elongated handle portion and a jaw portion at one end thereof having its longitudinal axis extending transversely of the longitudinal axis of said handle portion;
   B. a second operating member having an elongated handle portion and a jaw portion at one end thereof having its longitudinal axis extending transversely of the longitudinal axis of said handle portion, the longitudinal axes of the handle portions of said first and second operating members being closely spaced and substantially parallel, the jaw portion of said second operating member being disposed in spaced relationship to said first operating member to provide a spacing between said jaw portions for receiving a pipe therebetween;
   C. pivot means pivotably mounting said operating member adjacent the jaw portion of said first operating member for movement of the jaw portions about a pivot point defined thereby in response to movement of said handle portions, said handle portions extending in close parallel relationship in the closed position thereof and the jaw portions also extending in generally parallel relationship in the closed position thereof, movement of said first operating member handle portion away from said second operating member handle portion causing pivoting of said jaw portions to increase the spacing therebetween at the outer ends thereof to permit insertion of a pipe therebetween, said pivot means comprising a disengageable fastener and aligned apertures in the two operating members, at least said second operating member having a series of apertures spaced along the longitudinal axis of its handle portion whereby said disengagable fastening means will permit the shifting of the pivot point along the length of said second operating member to vary the spacing between said jaw portions in the closed position thereof;
   D. a pair of guide roller means rotatably mounted on each of said jaw portions and spaced along the length thereof with the periphery of said guide roller means extending beyond the opposed edges of said jaw portions and defining an imaginary circle therebetween for gripping and rotatably supporting a pipe therebetween;
   E. cutting means mounted on the jaw portion of said one operating member for movement between the opposed edges of the jaw portion and into the imaginary circle defined by said guide roller means; and
   F. adjustment means for said cutting means mounted on said jaw portion of said first operating member and operable to move said cutting means relative to the opposed edge of the jaw portion, whereby the pipe may be gripped between said jaw portions and supported upon said roller means by one-handed gripping of said handle portions and the cutting means may be advanced by manipulation of the adjustment means into progressively deeper engagement with the associated pipe to sever the pipe upon rotation of the cutting device about the pipe.

8. The cutting device of claim 7 wherein said cutting means is disposed adjacent the pair of rollers closest to the handle portion of said first operating members.

9. The cutting device of claim 7 wherein said opposed edges of said jaw portions are concavely arcuate between the pair of spaced guide roller means thereof.

* * * * *